United States Patent [19]

Arden

[11] Patent Number: 4,663,176

[45] Date of Patent: May 5, 1987

[54] FROZEN MOUSSE AND METHOD OF MAKING SAME

[75] Inventor: Sidney Arden, Lawrence, N.Y.

[73] Assignee: Glacial Confections, Inc., Westport, Conn.

[21] Appl. No.: 839,442

[22] Filed: Mar. 10, 1986

Related U.S. Application Data

[63] Continuation of Ser. No. 778,590, Sep. 20, 1985.

[51] Int. Cl.[4] .............................................. A23G 9/02
[52] U.S. Cl. .................................... 426/565; 426/613
[58] Field of Search ............... 426/564, 565, 566, 567, 426/571, 572, 613

[56] References Cited

U.S. PATENT DOCUMENTS

| | | | |
|---|---|---|---|
| 1,266,201 | 5/1918 | Boddington . | |
| 1,935,596 | 11/1933 | Fear ...................................... | 426/565 |
| 2,112,442 | 3/1938 | Libanoff . | |
| 2,233,178 | 2/1941 | Otting ................................. | 426/565 |
| 2,267,911 | 12/1941 | Grettie ................................ | 426/565 |
| 2,343,767 | 3/1944 | Getz .................................... | 426/565 |
| 2,558,453 | 6/1951 | Minster . | |
| 2,757,092 | 7/1956 | Zepp . | |
| 3,369,912 | 2/1968 | Livengood . | |
| 3,372,035 | 3/1968 | Morrison . | |
| 3,383,219 | 5/1968 | Patterson . | |
| 3,385,714 | 5/1968 | Smith . | |
| 3,391,002 | 7/1968 | Little . | |
| 3,396,039 | 8/1968 | Leo . | |
| 3,407,076 | 10/1968 | Ganz . | |
| 3,535,122 | 10/1970 | Mussellwhite et al. ............. | 426/565 |
| 3,615,718 | 10/1971 | Ozner . | |
| 3,883,670 | 5/1975 | Pennings ............................ | 426/568 |
| 4,012,533 | 3/1977 | Jonas .................................. | 426/565 |
| 4,338,347 | 7/1982 | Trop et al. ......................... | 426/565 |
| 4,400,406 | 8/1983 | Morley ............................... | 426/565 |
| 4,497,841 | 2/1985 | Wudel ................................ | 426/565 |

OTHER PUBLICATIONS

*Prepared Foods,* May 1985.
M. Heatter, *Book of Great Chocolate Desserts* (Alfred A. Knoft, New York, 1981), 331-333.
G. D. Turnbow, et al., *The Ice Cream Industry* (2d Ed. John Wiley & Sons, Inc., New York, 1947), 393.
W. S. Arbuckle, *Ice Cream* (2d Ed. Avi Publishing Co., Inc. Westport, Conn., 1972), 22-23.
W. J. Stadelman, et al., *Egg Science and Technology,* (2d Ed. Avi Publishing Co., Inc., Westport, Conn., 1977), 104-105 & 110-111.
Chemical Abstracts 66:4561K (pp. 43, 13, 1967), abstracting French Pat. No. 1,443,543.

*Primary Examiner*—Jeanette Hunter
*Attorney, Agent, or Firm*—Panitch Schwarze Jacobs & Nadel

[57] ABSTRACT

A composition for making a frozen mousse product consisting essentially of about 20 percent to about 28 percent sweetener, about 14 percent to about 17 percent butterfat substantially from cream, about 0.5 percent to about 11.5 percent cacao fat substantially from a source selected from the group consisting of chocolate, chocolate liquor, cocoa, cocoa butter and mixtures thereof, about 0.5 percent to about 3.5 percent egg yolks solids, up to about 1.0 percent of lecithin, and sufficient water whereby the composition has a total solids content of about 48 percent to about 58 percent, a total fat content of about 19 percent to about 25 percent, and not more than about 3 percent of milk solids not fat. Frozen mousse can be made from the composition by freeze-stirring the composition in standard ice cream freezers.

18 Claims, No Drawings

FROZEN MOUSSE AND METHOD OF MAKING SAME

This is a continuation of Ser. No. 778,590 filed Sept. 20, 1985.

FIELD OF THE INVENTION

The present invention relates to frozen dessert mousse and methods of making the same. More particularly, the present invention is directed to frozen mousse, a composition for making frozen mousse and methods of making them in standard ice cream processing equipment. The resulting frozen mousse is more resistant to melting and thermal shock and is superior in keeping qualitites than ice cream or prior art frozen mousse products. The frozen mousse of the present invention is made entirely from natural ingredients and retains the desirable mouth feel of conventional dessert mousse without the problems associated with the making, shipping and storage of conventional mousse.

BACKGROUND OF THE INVENTION

Traditionally, dessert mousse is a mixture of heavy cream, eggs and sugar, together with flavoring ingredients (usually mainly chocolate). A typical recipe calls for separating the egg whites from the egg yolks, beating the egg whites and yolks separately, and then combining the beaten egg yolks with melted chocolate plus the other flavoring. After blending the mixture, the beaten egg whites are folded into the mixture and then the mixture is folded into stiffly whipped cream before chilling. The present procedure of making mousse is not readily adapted to a commercial process due to the numerous beating, whipping and combining steps. These steps must be closely controlled to assure a finely texture mousse product which will hold up in extended storage.

The prior art procedure is arduous, time-consuming and requires considerable skill to produce a satisfactory finished product. It is not suitable for commercial production using standard ice cream processing equipment.

In addition, mousse is both fragile and highly perishable. The beaten portions of the ingredients, i.e. the cream and egg whites, tend to collapse within a short time. The same ingredients make the mousse susceptible to rapid spoilage unless it is refrigerated. Even when refrigerated or frozen, prior art mousse products tend to degrade. Frozen mousse products are extremely sensitive to thermal shock.

Mousse powders are available to eliminate some of the arduous and time-consuming steps in making mousse. The powders are comprised of imitation ingredients which attempt to simulate the natural ingredients. Various types of frozen mousse are available from stores in which artificial ingredients are used to replace the cream. The products typically are packed in shallow aluminum dishes and have a very limited shelf-life.

Several texts include descriptions of frozen mousse. However, these are basically frozen whipped cream with added sugar, color and flavor. These products do not have a true mousse texture or an extended keeping quality.

For commercially produced mousse, it is necessary to pasteurize the mix to prevent bacterial contamination. Therefore, the eggs in the mix must be protected from coagulation during heating. In a typical ice cream plant, pasteurization temperatures may reach about 160° F.–170° F. (about 71.7° C.–76.7° C.) in batch processing.

The present invention comprises an improved mousse product which can be easily produced commercially using standard ice cream equipment. The product has true mousse texture and mouth feel, and is slow-melting and of superior keeping quality. The present invention also includes a mousse composition which can be pasteurized and used as a base for various mousse flavors by the addition of desired flavor ingredients. The method of the present invention minimizes the number of time-consuming steps in the manufacture of frozen mousse, and achieves better product uniformity.

SUMMARY OF THE INVENTION

One aspect of the present invention comprises a composition for making a frozen mousse product consisting essentially of about 20 percent to about 28 percent sweetener, about 14 percent to about 17 percent butterfat substantially from cream, about 0.5 percent to about 11.5 percent cacao fat substantially from a source selected from the group consisting of chocolate, chocolate liquor, cocoa, cocoa butter and mixtures thereof, about 0.5 percent to about 3.5 percent egg yolks solids, up to about 1.0 percent of lecithin, and sufficient water whereby the composition has a total solids content of about 48 percent to about 58 percent, a total fat content of about 19 percent to about 25 percent, and not more than about 3 percent of milk solids not fat.

Frozen mousse of the present invention can be made from the composition by freeze-stirring the composition in an ice cream freezer to the desired amount of overrun, usually with the addition of various flavoring ingredients.

Another aspect of the present invention relates to a method for making a composition for a frozen mousse product comprising (a) providing in a mixer an aqueous component selected from the group consisting of water, syrup, egg yolks and mixtures thereof, and water content of the aqueous component being about 50 percent to about 60 percent of the water content of the composition, excluding water contained in cream, heating the aqueous component to a temperature at which chocolate will melt and below which protein in egg yolks will coagulate, (c) blending with the aqueous component a substantially dry component selected from the group consisting of sweetener, dried egg yolks, cocoa and mixtures thereof, including mixing the mixture of aqueous and dry components for a time until the egg yolks from step (a) and (c) are substantially hydrated, (d) blending with the mixture resulting from step (c) a cacao fat containing ingredient selected from the group consisting of chocolate pieces, melted chocolate, chocolate liquor, cocoa butter, cocoa and mixtures thereof, including mixing the cacao fat containing ingredient until it is thoroughly incorporated in the mixture, (e) blending with the mixture resulting from step (d) water sufficient to produce a water content of the composition of about 42 percent to about 52 percent, including water contained in cream, and (f) blending with the mixture resulting from step (e) cream in an amount to have a butterfat content in the composition of about 14 percent to about 17 percent.

The method also preferably includes the steps of (g) pasteurizing the mixture resulting from step (f), (h) homogenizing the mixture resulting from step (g), and (i) refrigerating the mixture resulting from step (h).

DETAILED DESCRIPTION OF THE PREFERRED EMBODIMENTS

The frozen mousse mix composition of the present invention as summarized above has a high total fat content, a relatively high cacao fat content and a high total solids content, while having a low content of milk solids not fat ("MSNF"). This combination results in frozen mousse having a silky, smooth texture with excellent mouth feel. Since there is a high solids content, there is a corresponding low water content. Accordingly, there is less water to crystallize during freezing and storage. The high fat content and the relatively high melting point of the cacao fat provides better shape retention, freeze-thaw stability, storage and slow melting properties, especially when a frozen mousse made according to the present invention contains an appropriate overrun.

There are many suitable natural ingredients which can be used to derive the components of the composition of the present invention. Preferred ingredients to provide the components in the appropriate proportions will now be described, it being understood that many minor variations in the composition can be made by those skilled in the art without adversely affecting the composition or resulting frozen mousse. Generally, when the term "percent" or "%" is used herein, it means weight percent of the entire composition, unless otherwise specifically indicated or unless it is otherwise clear from the context in which it is used.

The separate sweetener component of the new frozen mousse composition is preferably sugar in the form of sucrose, but up to 10% to about 15% corn syrup solids may be used if desired in conjunction with sucrose. The sugar ingredient can be in the form of granulated sucrose (cane or beet sugar) or in the form of sucrose syrup. The sweetener is present in the composition in an amount of about 20% to about 28%, and as presently preferred, the sweetener content is about 14.5% to about 18.5%, not including sugar or other sweetener present in ingredients such as semi-sweet chocolate. Semi-sweet chocolate typically contains about 49% sugar. Accordingly, as used herein, "sweetener" means the sugar, the sweetener component of syrup or other sweetener ingredient added as a separate ingredient, rather than the total amount of sweetener which may be present in ingredients such as chocolate, sugared egg yolks solids, etc.

The butterfat component preferably is derived from heavy cream, sometimes known as whipping cream. Heavy cream contains about 30% to about 40% butterfat, and is typically available containing 36% butterfat. The cream may be fresh, frozen or reconstituted and may be standardized to a uniform butterfat content in the range set forth above by the inclusion of a small amount of MSNF. The MSNF can be derived from milk (including condensed milk, skim milk, and condensed skim milk), non-fat dry milk, or solely from non-fat dry milk with the addition of water. The butterfat content of the composition should be from about 14% to about 17%. The presently most preferred range is about 14.4% to about 16.0% butterfat from heavy cream containing 36% butterfat.

The cacao fat component of the present invention can be derived from chocolate and preferably semi-sweet chocolate containing 30% to about 50% cacao fat, chocolate liquor, naturally processed or Dutch processed cocoa (containing about 8% to about 24% cacao fat), or cocoa butter, and preferably deodorized cocoa butter. It is presently preferred that most to almost all of cacao fat be derived from semi-sweet chocolate. The cacao fat component of the composition of the present invention should be about 0.5% to about 11.5%, and preferably about 3.5% to about 9.0%.

Where both chocolate and cocoa are used in the composition, most often the chocolate is included to provide the great bulk of the cacao fat content and the cocoa is included more as a flavor and color ingredient. The presently most preferred range of chocolate and cocoa in the composition is about 11% to about 26% semi-sweet chocolate and zero to about 3.0% cocoa.

When cocoa butter is the ingredient providing the cacao fat content for the composition, it is preferable to add lecithin, a natural emulsifier present in chocolate, but not in cocoa butter, in an amount of up to about 1%, and preferably in an amount of about 0.2% to about 0.6%. A small amount of vanilla, for flavor, is also preferred when using cocoa butter instead of chocolate for the cacao fat containing ingredient.

Although prior art mousse products are characterized by a significant amount of egg whites, the composition of the present invention includes substantially no egg whites. Rather, the present composition uses egg yolks to provide an egg yolks solid content of about 0.5% to about 3.5%, preferably about 2.0% to about 3.0%.

Egg yolks act as a natural emulsifier which aids in blending the chocolate or other cacao fat containing ingredient into the composition as will be described hereinafter. The egg yolks used in the present invention can be fresh egg yolks, dried egg yolks, or sugared frozen egg yolks. The egg yolks should be substantially free from egg whites, although it will be appreciated that not absolutely all of the whites can be removed from the egg yolks in the separation process. Nevertheless, the egg yolks should be as free as practical of the egg whites. The mousse of the present invention retains the fluffy texture characteristic of a fine mousse, even though egg whites are omitted. Additional processing benefits are derived by avoiding coagulation of the egg whites during pasteurization and the time-consuming factor of whipping the whites.

The water content of the composition of the present invention generally constitutes about 42% to about 52% of the composition. This percentage includes the water present in the other ingredients. This corresponds to a level of total solids in the composition of about 48% to about 58%. The presently preferred water content of the composition is about 44% to about 50%. In the presently most preferred composition, except where a sweetener syrup is used, water is added as a separate ingredient in an amount of about 20% to about 21%, not including the water contained in the cream or other components of the composition.

Although various flavoring additives can be added to the composition mix for preparing the frozen mousse of the present invention, the composition including the basic ingredients need not have any additional flavoring components, since the flavoring components can be added at the time the mix is used to make the novel frozen mousse product.

The flavoring components of the new frozen mousse are selected from any known flavoring ingredient according to the desired taste. This constituent includes, by way of illustration and not by way of limitation, cocoa, coffee, fruit, nuts, chocolate, chocolate chips, cookie bits, liqueurs and vanilla, either natural or artificial. Salt and spices may be added. The solid flavor ingredients can be introduced into the frozen mousse by any suitable means known to those skilled in the art, such as through a fruit feeder as the mousse is extruded from a freezer before packing. Those skilled in the art will comprehend the use and adjustments necessary for the particular flavors.

Variegating syrups can be added to the frozen mousse of the present invention in the same manner as they are added to ice cream and ice milk products. The variegating syrups are injected with a variegator into the frozen mousse just before packing. Chocolate, butterscotch and fruit variegating syrups are just some of the examples.

The frozen mousse of the present invention and compositions for making it are made by a novel method, well suited for commercial production using conventional ice cream processing equipment. The method includes unique blending steps in which certain indicated steps must be performed in a critical order to obtain a high quality product.

In general, the method of the present invention begins by adding about 50% to about 60% of the total amount of water added as a separate ingredient or contained in sweetener syrup, not including the water in cream, and preferably about half of the added water to a mixing vessel, such as a pasteurizing vat equipped with an agitator capable of thoroughly blending the ingredients. Alternately, other aqueous ingredients, such as syrup or syrup plus water and/or liquid egg yolks can be added to the mixer. As explained further below, this step of starting with part of the added water, rather than all of it, is a critical step in producing an acceptable product.

The water and any other aqueous ingredients (the "aqueous component") are then heated to a temperature at which chocolate will melt, but below which the protein in the egg yolks will coagulate. Typically, the aqueous component can be heated to about 125° F. (51.7° C.) to about 180° F. (82.2° C.).

Next, a substantially dry mixture of sweetener (assuming not all the sweetener has been made as an aqueous syrup), dried egg yolks (assuming that not all of the egg yolks were added previously as liquid egg yolks) and any cocoa are blended with the aqueous component to allow sufficient time for good hydration of the yolks solids. Typically, the average minimum mixing time is about 15 to about 20 minutes.

A cacao fat containing ingredient is blended with the mixture resulting from the blending of the aqueous and dry components. As further explained below, it is also critical that the cacao fat containing ingredient is added to the mixture resulting from the blending of the aqueous and dry components to assure proper blending of the chocolate or other cacao fat containing ingredient. The cacao fat containing ingredient includes chocolate pieces, in the form of bits, granules or the like which can be dispersed throughout the mixture and readily melted therein, or melted chocolate, cocoa butter, cocoa, or mixtures thereof. The cacao fat containing ingredient should be added slowly, and mixed at a temperature sufficient to allow complete melting and blending thereof until it is thoroughly incorporated in the mixture.

The temperature of the mixture is maintained during the blending of the cacao fat containing ingredient at about 110° F. (43.3° C.) to about 120° F. (48.9° C.), and the mixing occurs for about 10 to about 15 minutes after the chocolate is melted.

Thereafter, the remainder of the water is slowly added in an amount to produce a total solids content for the composition, including the water in the cream and any other component, in the range set forth hereinbefore. Following the water addition, the cream is blended into the mixture until it is thoroughly mixed, whereby the composition of the present invention has been formed.

The composition then can be pasteurized, homogenized and refrigerated. Pasteurization may proceed at a temperature of about 145° F. (62.8° C.) to about 170° F. (76.7° C.) for corresponding times from about 30 minutes to about 10 minutes, depending upon the temperature selected.

Homogenization is accomplished using standard homogenizing equipment at about 500 p.s.i. (35.15 kg/cm$^2$) to about 1,500 p.s.i. (105.45 kg/cm$^2$). Typically, homogenization occurs using equipment such as a Cherry-Burrell high pressure homogenizer at about 1,000 p.s.i. (70.31 kg/cm$^2$). Refrigeration of the composition is preferably to about 40° F. (4.4° C.) in an apparatus such as a plate heat exchanger.

It is critical to produce an acceptable composition according to the present invention to add the water in two steps as indicated above. By including the indicated initial proportion of water as the aqueous component or as a portion of the aqueous component, proper and efficient blending of the dry components and cacao fat containing ingredient may be accomplished.

The other critical aspct of the method according to the present invention is to add the cacao fat containing ingredient (hereinafter "chocolate" for the purpose of this discussion) to the mixture of the aqueous and dry components comprising water, sweetener and egg yolks, as well as other dry flavoring ingredients, such as cocoa and/or instant coffee. The chocolate should not be added directly to the water or to a mixture including only water and sweetener. The egg yolks act as an emulsifier for the chocolate.

By adding the initial aqueous component containing water in two parts and blending the chocolate to the thoroughly blended mixture of water, sweetener and egg yolks, a water-in-oil emulsion is formed. The chocolate mixes smoothly with the water, sugar and egg yolks, even though the mixture may be very viscous. The chocolate is not streaky or lumpy and does not adhere to the beaters used in the mixing equipment. Additionally, the solid particles appear to be covered with an oil coating which results in an unexpectedly smooth-textured product. It is believed that these critical processing steps of adding the yolks to a portion of the water including the sweetener solution, and then adding the chocolate, results in a mix that whips readily and yields the unexpected slow melting, high stability properties of the present composition, in spite of its high solids content. Frozen mousse made according to the present invention can be stored in containers at up to about 15° F. (−9.4° C.), whereas ice cream must usually be stored at lower temperatures, about −5° F. (−20.6° C.) to about 5° F. (−15° C.).

When the remaining water and cream have been added, the composition seems to be converted from the water-in-oil emulsion form existing after the addition of the chocolate to what appears to be a more typical oil-in-water emulsion associated with ice cream. Nevertheless, the composition still retains the unexpected properties set forth above.

After the composition is prepared, it can be flavored as desired and frozen-stirred in standard ice cream freezers to have an overrun from about 40% to about 75%, and preferably an overrun of about 60%. Any type of flavoring components or additives, preferably natural, can be added to the composition in a manner well known to those skilled in the art using conventional ice cream processing equipment. Preferably, the addition of flavoring ingredients occurs after aging the composition in a refrigerated tank for several hours at a temperature of about 40° F. (4.4° C.).

The frozen mousse of the present invention and the method of making them will now be illustrated in more detail with reference to the following specific, non-limiting examples:

EXAMPLE I

A frozen chocolate mousse was made from the composition of the present invention with the following ingredients:

| Ingredient | Wt. Percent |
|---|---|
| Heavy cream (36% fat) | 43.00 |
| Water | 21.00 |
| Granulated cane sugar | 16.46 |
| Semi-sweet chocolate | 14.25 |
| Dried egg yolks | 2.50 |
| Dutch processed cocoa (22-24% fat) | 2.50 |
| Instant coffee | 0.26 |
| Vanilla Extract | 0.03 |
| | 100.00 |

Half of the water as the sole initial aqueous component was added to a pasteurizing vat provided with an agitator and a steam heating jacket. The agitator was started and the heat turned on. When the temperature reached 170° F.-180° F. (76.7° C.-82.2° C.), the heat was turned off, and the instant coffee sprinkled in. The dried egg yolks and the cocoa were mixed with several times (at least three) their weight of sugar to prevent lumping in the batch. This mixture, along with the remainder of the sugar, was slowly added to the water in the vat and thoroughly blended for about 10-15 minutes, during which time the temperature of the batch was allowed to fall to 110° F.-120° F. (43.3° C.-48.9° C.). It is not crucial to the present invention to add the sugar in two or more steps.

The chocolate was broken into very small pieces, to insure rapid melting, then added slowly into the vat. The heat was turned on to maintain the temperature at 110° F.-120° F. (43.3° C.-48.9° C.) while the chocolate was melting. With continued agitation and melting of the chocolate, it was observed that the mixture including the chocolate which is at first extremely viscous, becomes smooth and glossy in appearance, typical of a water-in-oil emulsion. The batch was mixed for 10-15 minutes to allow complete blending, then the remainder of the water was slowly added, followed by the heavy cream. At this point, the batch changed in appearance to a typical oil-in-water emulsion similar to ice cream mix. The complete composition was pasteurized at 160° F. (71.7° C.) for 30 minutes, then homogenized at 1,000 p.s.i. (70.31 kg/cm$^2$) in a Cherry-Burrell high pressure homogenizer and cooled to 40° F. (4.4° C.) in a plate heat exchanger.

After aging in a refrigerated tank overnight, the vanilla extract was added, and the composition was frozen to 60% overrun in a Cherry-Burrell VS-250 continuous freezer and packed in pint containers.

The frozen mousse product of the composition according to the present invention had the appearance and texture of a typical frozen mousse but was much easier to produce. After storing the product in an ice cream hardening room at $-20°$ F. to $-25°$ F. ($-28.8°$ C. to $-31.6°$ C.) for several days, pint containers of the mousse were allowed to stand for four hours at room temperature (approximately 68° F. (20° C.)), as were similar containers of ice cream containing 18% total fat. At the end of this time the frozen mousse retained its shape and texture whereas the ice cream melted and collapsed.

Samples of the new frozen mousse were stored in freezer cabinets at 0° F. to 5° F. ($-17.7°$ C. to $-15°$ C.) for six months. After this period they were found to be satisfactory in flavor with no evidence of spoilage or excess crystallization. Samples of the new frozen mousse also were stored for three months in a controlled temperature refrigerator set at 13° F. ($-10.6°$ C.) +/$-2°$ F. (1.1° C.). After this time they were examined and found to retain their flavor and texture. There was no evidence of excess crystallization.

EXAMPLE II

A composition according to the present invention and a frozen mousse product made therefrom using the following ingredients were prepared in the same manner as Example I, except the step of mixing part of the sugar with the cocoa and dried egg yolks are changed to omit the cocoa.

| Ingredient | Wt. Percent |
|---|---|
| Heavy cream (36% fat) | 40.00 |
| Semi-sweet chocolate | 22.50 |
| Water | 20.00 |
| Granulated cane sugar | 14.57 |
| Dried egg yolks | 2.70 |
| Instant coffee | 0.20 |
| Salt | 0.03 |
| | 100.00 |

EXAMPLE III

A composition according to the present invention and a frozen mousse product made therefrom using the following ingredients were prepared in the same manner as Example I, except that the cane sugar syrup was added first to a vessel and mixed with a high shear speed LIKWIFIER mixer sold by Breddo Corp. and heated to 130° F. (54.4° C.). The cocoa was added, one third at a time, to the vessel and each addition was mixed for about 5 seconds until the mixture ingredients were thoroughly wetted. The same addition technique was followed with the instant coffee. The mixture was then transferred to another vessel where the thawed egg yolks were slowly blended into the mixture. The sugar syrup and frozen egg yolks contain approximately half of the water added as separate aqueous components (the syrup, and egg yolks), not including the cream. The mixture is then transferred to a pasteurizing vat where the semi-sweet chocolate is blended in a manner as set forth in Example I. The remainder of the method is also as set forth in Example I.

| Ingredient | Wt. Percent |
| --- | --- |
| Heavy Cream (36% fat) | 43.00 |
| #2 cane sugar syrup (67.5% solids) | 26.47 |
| Semi-sweet chocolate | 13.25 |
| Water | 9.00 |
| Frozen sugared egg yolks | 5.30 |
| Cocoa (22-24% fat) | 2.75 |
| Instant coffee | 0.20 |
| Vanilla extract | 0.03 |
| | 100.00 |

EXAMPLE IV

A composition according the present invention for making frozen mousse was prepared in the same manner as Example I using the following ingredients. The composition was pasteurized, homogenized and refrigerated as in Example I, and was used as a basic mix to make a variety of flavored frozen mousse products as illustrated by the specific, non-limiting Examples V–VII below.

| Ingredient | Wt. Percent |
| --- | --- |
| Heavy Cream | 44.00 |
| Water | 20.25 |
| Granulated cane sugar | 18.25 |
| Semi-sweet chocolate | 15.00 |
| Dried egg yolks | 2.50 |
| | 100.00 |

EXAMPLE V

Components

90% by volume basic frozen mousse mix from Example IV frozen to 60% overrun.
10% by volume natural raspberry variegating syrup (60% total solids).

The basic mousse mix was frozen in a continuous ice cream freezer to 60% overrun. The raspberry variegated syrup was first cooled to 40° F. (4.4° C.), then injected into the frozen mousse through a variegator. Total weight per gallon of the finished frozen mousse was 6.00 lbs. (0.72 g/cc).

EXAMPLE VI

Components

92% by weight basic frozen mousse mix from Example IV frozen to 60% overrun.
8% broken almonds (30–16 screen size).

The basic mousse mix was frozen in a continuous ice cream freezer to 60% overrun. The almonds were injected through a fruit feeder into the frozen mousse. Total weight per gallon of the finished frozen mousse was 5.65 lbs. (0.68 g/cc).

EXAMPLE VII

Components 99.7% basic frozen mousse mix (from Example IV).
0.03% peppermint extract.

The mousse mix was portioned into a flavor tank where the peppermint extract was mixed in with constant agitation. Subsequently, the flavored mousse mix was frozen to 60% overrun.

EXAMPLE VIII

A composition for making a so-called "white chocolate" mousse according to the present invention and a white chocolate mousse product made therefrom using the following ingredients were prepared.

| Ingredient | Wt. Percent |
| --- | --- |
| Heavy cream (36% fat) | 43.75 |
| Granulated cane sugar | 27.00 |
| Water | 20.11 |
| Deodorized cocoa butter | 6.00 |
| Dried egg yolks | 2.60 |
| Soya bean lecithin | 0.50 |
| Vanilla extract | 0.04 |
| | 100.00 |

The granulated cane sugar and dried egg yolks were mixed with approximately half of the added water in the manner set forth in Example I. Cocoa butter was melted at 110° F. to 120° F. (43.3° C. to 48.9° C.). The lecithin was added to the melted cocoa butter and the mixture of cocoa butter and lecithin was blended into the mixture of water, sugar and egg yolks in the same manner as Example I. Thereafter, additional blending and processing of the composition and the white chocolate frozen mousse product made therefrom were prepared as in Example I.

The present invention may be embodied in other specific forms without departing from the spirit or essential attributes thereof and, accordingly, reference should be made to the appended claims, rather than to the foregoing specification as indicating the scope of the invention.

I claim:

1. A composition for making a frozen mousse product consisting essentially of about 20 percent to about 28 percent sweetener, about 14 percent to about 17 percent butterfat substantially from cream, about 0.5 percent to about 11.5 percent cacao fat substantially from a source selected from the group consisting of chocolate, chocolate liquor, cocoa, cocoa butter and mixtures thereof, about 0.5 percent to about 3.5 percent egg yolks solids, up to about 1.0 percent of lecithin, and sufficient water whereby the composition has a total solids content of about 48 percent to about 58 percent, a total fat content of about 19 percent to about 25 percent, and not more than about 3 percent of milk solids not fat.

2. A composition according to claim 1 wherein the cacao fat is derived from the cacao fat in semi-sweet chocolate and cocoa.

3. A composition according to claim 1 wherein the cacao fat is derived from cocoa butter and wherein lecithin is present in an amount of about 0.2 percent to about 0.6 percent.

4. A composition according to claim 1 further including flavoring.

5. A composition according to claim 4 wherein the flavoring is selected from the group consisting of vanilla, coffee, mint, fruit syrup, fruit pieces, nuts, candy pieces, cookie pieces, chocolate, butterscotch, liqueur, and mixtures thereof.

6. A composition according to claim 1 wherein the cacao fat content is about 3.5 percent to about 9.0 percent, the egg yolks solids content is about 2.0 percent to about 3.0 percent, and wherein the composition has a total solids content of about 50 percent to about 56 percent, a total fat content of about 20 percent to about 24 percent, and a milk solids not fat content of about 2.0 percent to about 2.8 percent.

7. A composition according to claim 1 consisting essentially of about 20 percent to about 21 percent water, about 14.5 percent to about 18.5 percent sweetener, about 2.5 percent to about 3.5 percent egg yolks solids, about 11 percent to about 26 percent semi-sweet chocolate, up to about 3.0 percent cocoa, and about 14.4 percent to about 16.0 percent butterfat from heavy cream having a butterfat content of about 30 percent to about 40 percent.

8. A frozen mousse comprising the composition of any one of claims 1 through 7.

9. A method for making a composition for a frozen mousse product comprising
   (a) providing in a mixer an aqueous component selected from the group consisting of water, syrup, egg yolks and mixtures thereof, the water content of the aqueous component being about 50 percent to about 60 percent of the water content of the composition, excluding water contained in cream,
   (b) heating the aqueous component to a temperature at which chocolate will melt and below which protein in egg yolks will coagulate,
   (c) blending with the aqueous component a substantially dry component selected from the group consisting of sweetener, dried egg yolks, cocoa and mixtures thereof, including mixing the mixture of aqueous and dry components for a time until the egg yolks from step (a) and (c) is substantially hydrated,
   (d) blending with the mixture resulting from step (c) a cacao fat containing ingredient selected from the group consisting of chocolate pieces, melted chocolate, chocolate liquor, cocoa butter, cocoa and mixtures thereof, including mixing the cacao fat containing ingredient until it is thoroughly incorporated in the mixture,
   (e) blending with the mixture resulting from step (d) water sufficient to produce a water content of the composition of about 42 percent to about 52 percent, including water contained in cream, and
   (f) blending with the mixture resulting from step (e) cream in an amount and having a butterfat content sufficient to have a butterfat content in the composition of about 14 percent to about 17 percent.

10. A method according to claim 9 further comprising
    (g) pasteurizing the mixture resulting from step (f),
    (h) homogenizing the mixture resulting from step (g), and
    (i) refrigerating the mixture resulting from step (h).

11. A method according to claim 9, wherein the dry component is blended with the aqueous component at an initial temperature of about 125° F. (51.7° C.) to about 180° F. (82.2° C.) and the cacao fat containing ingredient is blended with the mixture of the aqueous component and dry component at a reduced temperature of about 110° F. (43.3° C.) to about 120° F. (48.9° C.).

12. A method according to claim 11 wherein the dry component consists essentially of sugar and dried egg yolks which is mixed for about 15 to about 30 minutes during blending with the aqueous component, and the cacao fat containing ingredient comprises chocolate selected from the group consisting of chocolate pieces and melted chocolate, which is mixed for about 10 minutes to about 15 minutes after the chocolate is melted during blending with the mixture of the aqueous component and the dry component.

13. A method according to claim 10 wherein the pasteurizing step (g) proceeds at a temperature of about 145° F. (62.8° C.) for about 30 minutes to a temperature of about 170° F. (76.7° C.) for about 10 minutes.

14. A method according to claim 9 wherein a major portion of the sweetener is sucrose, the sweetener is present in an amount of about 20 percent to about 28 percent of the composition, the egg yolks are present in an amount whereby the composition has an egg yolks solids content of about 0.5 percent to about 3.5 percent, and the cacao fat containing ingredient is present in an amount whereby the composition has a cacao fat content of about 0.5 percent to about 11.5 percent.

15. A method according to claim 9 wherein the cacao fat containing ingredient comprises cocoa butter, and the process further comprises adding during step (d) lecithin in an amount up to about 1 percent of the composition.

16. A method according to claim 15 further comprising adding vanilla to the mixture during step (d).

17. A method for making a frozen mousse product comprising the method of claim 10 and further comprising
    (j) adding flavoring to the composition,
    (k) freeze-stirring the flavored composition to an overrun of about 40 percent to about 75 percent.

18. A method according to claim 17 wherein the overrun is about 60 percent.

* * * * *